US006626281B2

(12) United States Patent
Chiang et al.

(10) Patent No.: US 6,626,281 B2
(45) Date of Patent: Sep. 30, 2003

(54) WORKPIECE SHIFT APPARATUS FOR PUNCH PRESS

(75) Inventors: Chun Hsien Chiang, Taipei (TW); Liu Sheng Tang, Shenzhen (CN); Xu Dong Zhou, Shenzhen (CN); Zai Xing Wu, Shenzhen (CN); You Cai Yang, Shenzhen (CN); Ke Liu, Shenzhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 64 days.

(21) Appl. No.: 10/042,561

(22) Filed: Dec. 10, 2001

(65) Prior Publication Data

US 2003/0106441 A1 Jun. 12, 2003

(51) Int. Cl.[7] .......................... B65G 47/24; B25B 27/14
(52) U.S. Cl. .................................... 198/345.3; 29/281.1
(58) Field of Search ..................... 72/420, 421; 269/55, 269/58, 71; 198/345.3; 414/749.1, 749.6; 83/466; 29/281.1, 281.3, 464, 466, 468

(56) References Cited

U.S. PATENT DOCUMENTS 4,138,774 A * 2/1979 Oyama ...................... 29/281.1

FOREIGN PATENT DOCUMENTS

JP 4-01075315 A * 3/1989

* cited by examiner

*Primary Examiner*—Allen Ostrager
*Assistant Examiner*—Jimmy Nguyen
(74) *Attorney, Agent, or Firm*—Wei Te Chung

(57) ABSTRACT

A workpiece shift apparatus includes a bottom plate (30), a middle plate (50) slidably attached on the bottom plate, and a top plate (80) slidably attached on the middle plate and defining cutouts (86). A first pushing means is installed on the bottom plate and includes a first piston cylinder (32), a first piston rod (34), and a first handspike (38). The combined middle plate and top plate is moveable in a first direction by the first pushing means actuating the first handspike to push the middle plate. A second pushing means is installed on the middle plate and includes a second piston cylinder (56), a second piston rod (58), a third piston cylinder (70), a third piston rod (72), and a second handspike (73). The top plate is moveable in a second direction by the second pushing means actuating the second handspike sequentially inserted into the cutouts.

18 Claims, 4 Drawing Sheets

WORKPIECE SHIFT APPARATUS FOR PUNCH PRESS

BACKGROUND OF THE INVENTION

1. Field of the Invention

The present invention relates to shift apparatuses, and particularly to workpiece shift apparatuses used for punch presses.

2. Related Art

Various electronic devices are ubiquitous in modern society. For example, computer servers and routers pervade the business world. Many such electronic devices generate a lot of heat during normal operation. This can deteriorate their operational stability and damage associated electronic devices. Thus a number of vents are defined in such electronic devices for facilitating heat dissipation.

Conventional means for machining vents in a workpiece comprise, for example, laser machining and different types of punch machining. However, laser machining is costly and is therefore not widely used. A first type of conventional punch machining requires manual manipulation to control movements of workpieces. This is slow and unsafe. Furthermore, the workpieces are liable to be imprecisely machined. In a second type of conventional punch machining, cams are used to control movements of workpieces. However, when adjacent vents are spaced far apart, large cams and correspondingly large piston cylinders having large diameters and long ranges of movement are needed. A large punch press is thus needed, which is unduly costly.

An improved workpiece shift apparatus for a punch press which overcomes the above-mentioned problems and shortcomings is desired.

SUMMARY OF THE INVENTION

Accordingly, an object of the present invention is to provide a workpiece shift-apparatus which can readily and precisely move workpieces on a punch press.

To achieve the above-mentioned object, a workpiece shift apparatus in accordance with the present invention comprises a die set, a bottom plate securely attached on the die set, a middle plate slidably attached on the bottom plate, and a top plate slidably attached on the middle plate. A vertical piston cylinder is located below the die set, and has a vertical piston rod extending through the die set. A vertical location pin extends from a free end of the vertical piston rod, and is vertically moveable with the vertical piston rod. A first horizontal piston cylinder is installed on the bottom plate. The first horizontal piston cylinder has a first horizontal piston rod extendable in a first direction. A first handspike extends away from and is moveable with the first horizontal piston rod. The first handspike is engaged with the middle plate. A second horizontal piston cylinder is installed on the middle plate. The second horizontal piston cylinder has a second horizontal piston rod extendable in a second direction which is perpendicular to the first direction. A third horizontal piston cylinder is installed on the middle plate. The third horizontal piston cylinder has a third horizontal piston rod extendable in the first direction. A second handspike extends directly from the third horizontal piston rod, and is moveable with the third horizontal piston rod in the first direction. The third cylinder and the second handspike are moveable with the second horizontal piston rod in the second direction. The top plate defines a plurality of location holes for respective insertion of the location pin. The middle plate and the top plate are moveable in the first direction by the first handspike pushing the middle plate. The second handspike is sequentially engaged in cutouts defined in the top plate. The top plate is moveable in the second direction by the second handspike pushing the top plate.

Other objects, advantages and novel features of the present invention will be drawn from the following detailed description of preferred embodiments of the present invention with attached drawings, in which:

DESCRIPTION OF THE PREFERRED EMBODIMENT

Figure 1:
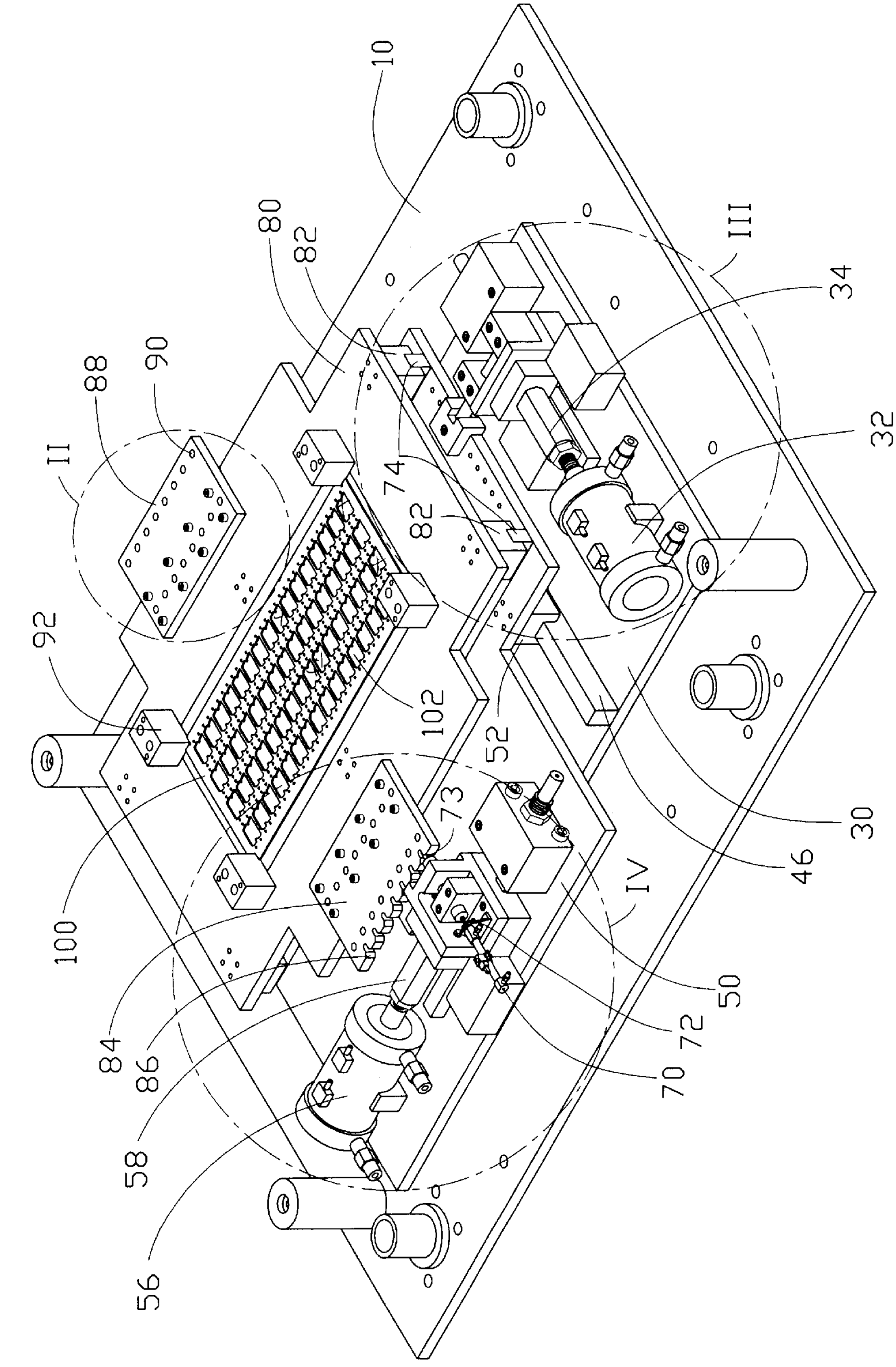
FIG. 1 is an assembled view of a workpiece shift apparatus in accordance with the present invention, together with a workpiece.

Referring to FIG. 1, a workpiece shift apparatus for a punch press in accordance with the present invention comprises a rectangular die set 10, a bottom plate 30, a middle plate 50 and a top plate 80.

Figure 2:
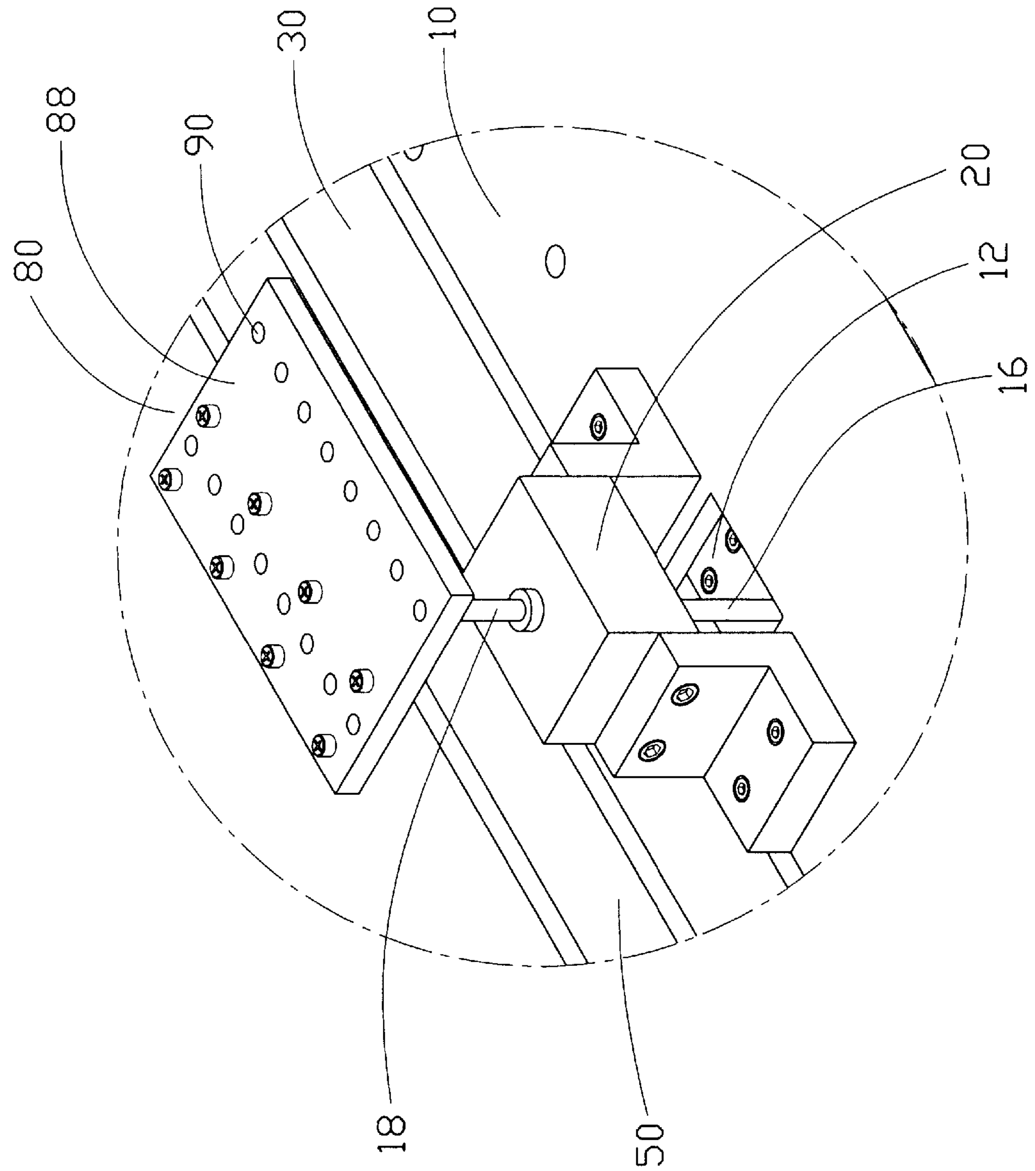
FIG. 2 is an enlarged view of a circled portion II of FIG. 1, but viewed from another aspect and showing more detail.

Referring also to FIG. 2, the die set 10 defines an opening 12 in one side thereof. A guiding bush 20 is slidably attached on the die set 10 and located above the opening 12. A vertical piston cylinder (not shown) is installed under the die set 10 and located below the opening 12. The vertical piston cylinder comprises a vertical piston rod 16 extending through the opening 12 of the die set 10. A location pin 18 extends from a free end of the vertical piston rod 16 through the guiding bush 20.

Figure 3:
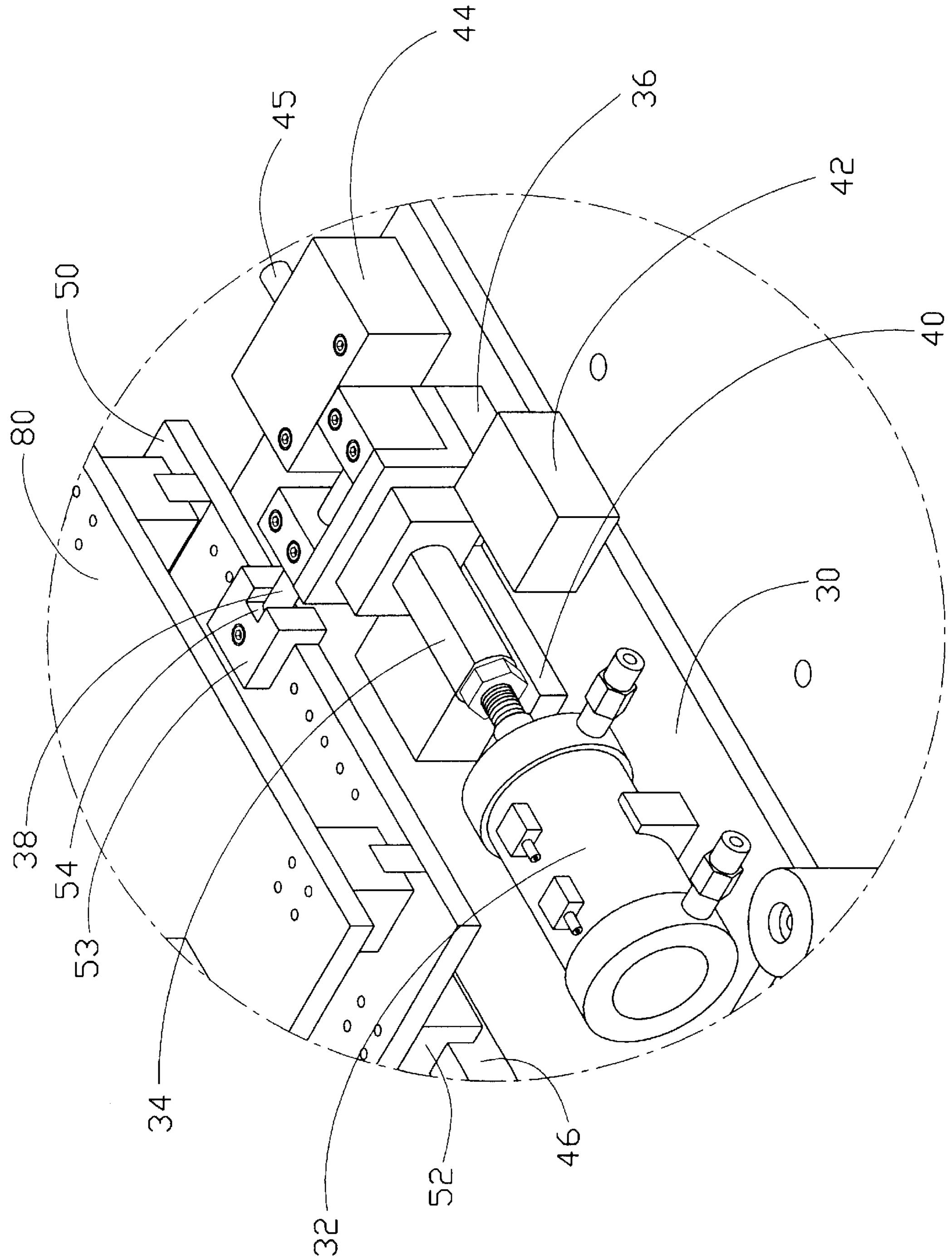
FIG. 3 is an enlarged view of a circled portion III of FIG. 1.

Referring also to FIG. 3, the bottom plate 30 is secured on a center portion of the die set 10. A first horizontal piston cylinder 32 is installed on the bottom plate 30. A first horizontal piston rod 34 extends from the first horizontal piston cylinder 32. The first horizontal piston rod 34 is extendable away from the first horizontal piston cylinder 32 in a first direction. A first bar 40 is secured on the bottom plate 30 parallel to the first horizontal piston rod 34. A pair of first guiding blocks 42 is secured on the bottom plate 30, on opposite sides of the first bar 40 respectively. A first sliding block 36 is slidably attached on the first bar 40 between the first guiding blocks 42. The first sliding block 36 is securely engaged with a free end of the first horizontal piston rod 34, and is therefore moveable with the first horizontal piston rod 34 in the first direction. A first handspike 38 extends from the sliding block 36 perpendicular to the first horizontal piston rod 34. A first stop block 44 is secured on the bottom plate 30, and abuts an end of the first bar 40. The first stop block 44 is for limiting sliding movement of the first sliding block 36 along the first bar 40. A first buffer 45 is installed in the stop block 44. A pair of parallel first rails 46 is formed on the bottom plate 30 parallel to the first horizontal piston rod 34. One of the first rails 46 is located adjacent to the first horizontal piston cylinder 32. The other of the first rails 46 (not visible) is located near a side of the bottom plate 30 that is opposite to the first horizontal piston cylinder 32.

Figure 4:
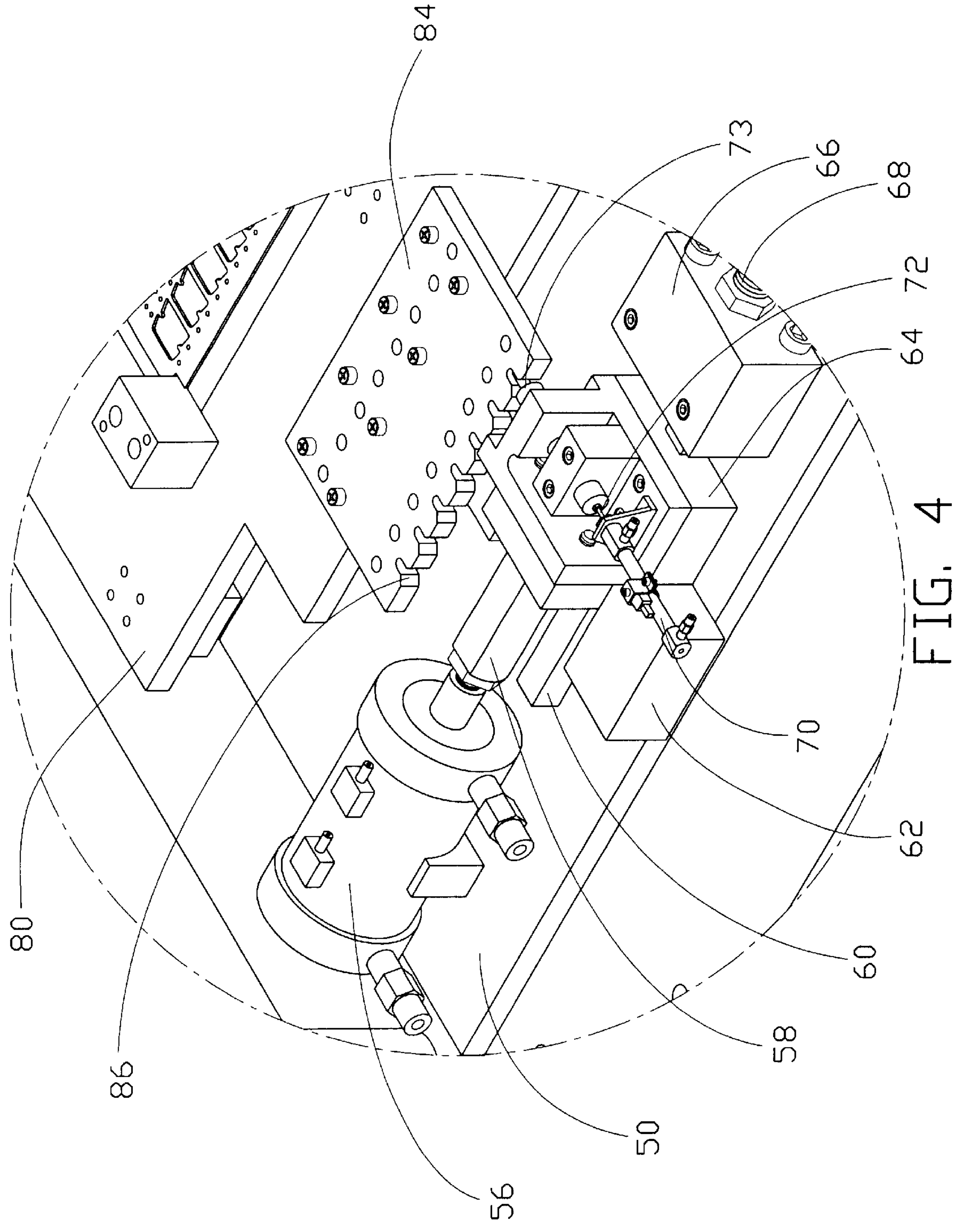
FIG. 4 is an enlarged view of a circled portion IV of FIG. 1.

The middle plate 50 is located above the bottom plate 30. A pair of first guideways 52 (only one shown) is formed on an underside of the middle plate 50. The first guideways 52 are slidably engaged with the first rails 46 of the bottom plate 30, and can thereby guide the middle plate 50 to move relative to the bottom plate 30. A fixed block 53 is secured on one side edge of the middle plate 50, corresponding to the first handspike 38. A first cutout 54 is defined in the fixed block 53, for receiving the first handspike 38. Referring also to FIG. 4, a second horizontal piston cylinder 56 is installed on the middle plate 50, and is oriented perpendicular to the first horizontal piston cylinder 32 of the bottom plate 30. A second horizontal piston rod 58 extends from the second horizontal piston cylinder 56. The second horizontal piston rod 58 is extendable away from the second horizontal piston cylinder 56 in a second direction which is perpendicular to the first direction. A second bar 60 is formed on the middle plate 50 parallel to the second horizontal piston rod 58. A pair of second guiding blocks 62 is secured on the middle plate 50, on opposite sides of the second bar 60 respectively. A second sliding block 64 is slidably attached on the second bar 60 between the second guiding blocks 62. The second sliding block 64 is securely engaged with a free end of the second horizontal piston rod 58, and is therefore moveable with the second horizontal piston rod 58 in the second direction. A second stop block 66 is secured on the middle plate 50, and abuts an end of the second bar 60. The second stop block 66 is for limiting sliding movement of the second sliding block 64 along the second bar 60. A second buffer 68 is installed in the second stop block 66. A third horizontal piston cylinder 70 is installed on the second sliding block 64. A third horizontal piston rod 72 extends from the third horizontal piston cylinder 70. The third horizontal piston rod 72 is extendable away from the third horizontal piston cylinder 70 in the first direction. A second handspike 73 extends directly from a free end of the third horizontal piston rod 72, and is moveable with the third horizontal piston rod 72. A pair of parallel second rails 74 is formed on the middle plate 50 perpendicular to the first horizontal piston rod 34 of the bottom plate 30.

Referring to FIG. 1 again, the top plate 80 is located above the middle plate 50. A pair of second guideways 82 is formed on an underside of the top plate 80. The second guideways 82 are slidably engaged with the second rails 74 of the middle plate 50, and can thereby guide the top plate 80 to move relative to the middle plate 50. A connect plate 84 is secured on one side of the top plate 80, adjacent the third horizontal piston cylinder 70. A plurality of evenly spaced second cutouts 86 is defined in a side of the connect plate 84, for respective insertion of the second handspike 73 thereinto. A location plate 88 is secured on a side of the top plate 80 that is opposite to the connect plate 84. Two rows of location holes 90 are defined in opposite sides of the location plate 88 respectively, for respective insertion of the location pin 18 of the vertical piston rod 16. Four location blocks 92 are secured on the top plate 80, for locating a workpiece 100 on the top plate 80.

In operation, the workpiece 100 is placed on a center of the top plate 80. The workpiece 100 requires four rows of vents 102 to be punched therein. The first horizontal piston rod 34 is located at a retracted position. At this position, the first sliding block 36 is spaced from the first stop block 44, and the location pin 18 of the vertical piston cylinder is in alignment with an outmost row of the location holes 90. The second horizontal piston rod 58 is extended and abuts the second stop block 66. The third horizontal piston rod 72 is located at a retracted position. At this position (not shown in the drawings), the second handspike 73 is located beyond the connect plate 84 between the second cutouts 86 and the second stop block 66. The second handspike 73 is spaced from a position opposite a nearest one of the second cutouts 86 a distance which is equal to a distance between each two adjacent second cutouts 86. The vertical piston rod 16 is extended. The location pin 18 is inserted in one of the outmost location holes 90 that is nearest to the first horizontal piston cylinder 32. Two pairs of punches (not shown) of the punch press are arranged in a rectangular formation. The punches are stamped onto the workpiece 100. Four vents 102 of two rows of the vents 102 are thus punched in the workpiece 100.

Then, the second horizontal piston rod 58 is retracted to a retracted position. A distance traveled by the second horizontal piston rod 58 from the extended position to the retracted position is equal to the distance between each two adjacent second cutouts 86. The distance between each two adjacent second cutouts 86 is equal to a distance each two adjacent vents 102 in each row of the vents 102. The third horizontal piston rod 72 is extended. The second handspike 73 is inserted into the neighboring one of the second cutouts 86 of the connect plate 84 (as shown in FIG. 1). The vertical piston rod 16 is retracted to a retracted position. The location pin 18 is therefore withdrawn from the said outmost location hole 90. The second horizontal piston rod 58 is extended, causing the second handspike 73 to push the connect plate 84 in the second direction. The top plate 80 is therefore moved toward the first horizontal piston cylinder 32 in the second direction, with the second guideways 82 sliding along the second rails 74. When the second horizontal piston rod 58 is located at the extended position, the third horizontal piston rod 72 is retracted to a retracted position to cause the second handspike 73 to move away from the corresponding second cutout 86. The vertical piston rod 16 is extended, causing the location pin 18 to insert into a next location hole 90 of the said outmost row of location holes 90. The punches of the punch press are stamped onto the workpiece 100 again. Another four vents 102 of the said two rows of the vents 102 are thus punched in the workpiece 100.

The above-described operations are repeated over and over until all of the said two rows of the vents 102 are punched. Then, the first horizontal piston rod 34 is extended, causing the first handspike 38 to push the middle plate 50 in the first direction. The combined top plate 80 and middle plate 50 is therefore moved toward the vertical piston cylinder in the first direction, with the first guideways 52 sliding along the first rails 46. The location pin 18 of the vertical piston cylinder is in alignment with an inmost row of location holes 90. The above-described movements of the punches are repeated over and over, with the connect plate 84 and the top plate 80 being moved in stages in a direction opposite to the second direction until the other two rows of the vents 102 of the workpiece 100 are fully punched. Four rows of the vents 102 are thus punched in the workpiece 100.

It is understood that the invention may be embodied in other forms without departing from the spirit thereof. Thus, the present example and embodiment is to be considered in all respects as illustrative and not restrictive, and the invention is not to be limited to the details given herein.

What is claimed is:

1. A workpiece shift apparatus comprising:

a bottom plate, a first horizontal piston cylinder installed on the bottom plate and having a first horizontal piston rod being moveable horizontally in a first direction, a first handspike connected and moveable with the first horizontal piston rod in the first direction;

a middle plate slidably attached on the bottom plate, the middle plate defining a first cutout receiving the first handspike and thereby allowing the first handspike to move the middle plate in the first direction, a second horizontal piston cylinder installed on the middle plate and having a second horizontal piston rod being moveable in a second direction perpendicular to the first direction, a third horizontal piston cylinder installed on the middle plate and comprising a third horizontal piston rod moveable in the first direction, a second handspike extending from and being moveable with the third horizontal piston rod in the first direction; the third horizontal piston cylinder and second handspike both being moveable with the second horizontal piston rod in the second direction; and a top plate attached on the middle plate and adapted for holding a workpiece thereon, the top plate defining a plurality of second cutouts for sequentially receiving the second handspike and thereby allowing the second handspike to move the top plate in the second direction, wherein the first horizontal piston cylinder, first handspike and middle plate cooperatively control movement of the workpiece in the first direction, and the second horizontal piston cylinder, third horizontal piston cylinder, second handspike and top plate cooperatively control movement of the workpiece in the second direction.

2. The workpiece shift apparatus as claimed in claim 1, further comprising a die set, wherein the bottom plate is secured on the die set, a vertical piston cylinder is located below the die set and has a vertical piston rod moveable extending through the die set, a location pin extends from a free end of the vertical piston rod and is moveable with the vertical piston rod, and the top plate defines a plurality of location holes for sequential insertion of the location pin to thereby precisely locate the workpiece.

3. The workpiece shift apparatus as claimed in claim 1, wherein a first stop block is secured on the bottom plate for limiting movement of the first horizontal piston rod, and a second stop block is secured on the middle plate for limiting movement of the second horizontal piston rod.

4. The workpiece shift apparatus as claimed in claim 3, wherein each of the stop blocks comprises a buffer secured therein.

5. The workpiece shift apparatus as claimed in claim 1, wherein a connect plate is secured on one side of the top plate adjacent the second horizontal piston cylinder, and the second cutouts are defined in the connect plate.

6. The workpiece shift apparatus as claimed in claim 2, wherein a location plate is secured on one side of the top plate adjacent the vertical piston cylinder, and the location holes are defined in the location plate.

7. The workpiece shift apparatus as claimed in claim 1, wherein the bottom plate comprises a pair of first rails parallel to the first direction, and the middle plate forms a pair of guideways slidably engaging with the first rails to thereby guide the middle plate and the top plate to move in the first direction.

8. The workpiece shift apparatus as claimed in claim 1, wherein the middle plate comprises a pair of second rails parallel to the second direction, and the top plate forms a pair of guideways slidably engaging with the second rails to thereby guide the top plate to move in the second direction.

9. The workpiece shift apparatus as claimed in claim 1, wherein a first bar is formed on the bottom plate parallel to the first direction, a first sliding block is slidably attached on the bar and connected with the first horizontal piston rod and the first handspike, and a pair of first guiding blocks is secured on the bottom plate on opposite sides of the first bar to thereby guide movement of the first sliding block.

10. The workpiece shift apparatus as claimed in claim 1, wherein a second bar is formed on the middle plate parallel to the second direction, a second sliding block is slidably attached on the second bar and engaged with the second horizontal piston rod, the third horizontal piston cylinder is installed on the second sliding block, and a pair of second guiding blocks is secured on the middle plate on opposite sides of the second bar to thereby guide movement of the second sliding block.

11. A workpiece shift apparatus comprising:

a bottom plate, a middle plate slidably attached on the bottom plate, a top plate slidably attached on the middle plate and adapted for holding a workpiece thereon, the top plate defining a plurality of cutouts in one side thereof;

a first pushing means installed on the bottom plate and comprising a first handspike engaging with the middle plate to thereby move the middle plate and the top plate in a first direction; and a second pushing means installed on the middle plate and comprising a second handspike, the top plate being repeatably movable in the second direction by the second pushing means actuating the second handspike sequentially inserted into the cutouts.

12. The workpiece shift apparatus as claimed in claim 11, wherein the first pushing means further comprises a first horizontal piston cylinder having a first horizontal piston rod moveable in the first direction, the first handspike being movable with the first horizontal piston rod in the first direction.

13. The workpiece shift apparatus as claimed in claim 11, wherein the second pushing means further comprises a second horizontal piston cylinder having a second horizontal piston rod moveable in the second direction, and a third horizontal piston cylinder having a third horizontal piston rod moveable in the first direction, the second handspike being moveable with the third horizontal piston rod in the first direction, the third horizontal piston cylinder and the second handspike being moveable with the second horizontal piston rod in the second direction.

14. The workpiece shift apparatus as claimed in claim 11, wherein the top plate comprises a location plate secured thereon, the location plate defines a plurality of location holes, a vertical piston cylinder is installed below the bottom plate, the vertical piston cylinder has a vertical piston rod moveable vertically, a location pin extends from a free end of the vertical piston rod and is received in a corresponding location hole to thereby precisely locate the workpiece.

15. The workpiece shift apparatus as claimed in claim 11, wherein the top plate comprises a connect plate secured thereon, and the second cutouts are defined in the connect plate.

16. The workpiece shift apparatus as claimed in claim 11, wherein a first stop block is secured on the bottom plate for limiting movement of the first horizontal piston rod, and a second stop block is secured on the middle plate for limiting movement of the second horizontal piston rod.

17. The workpiece shift apparatus as claimed in claim 12, wherein a first bar is formed on the bottom plate parallel to the first direction, a first sliding block is slidably attached on the bar and connected with the first horizontal piston rod and the first handspike, and a pair of first guiding blocks is secured on the bottom plate on opposite sides of the first bar to thereby guide movement of the first sliding block.

18. The workpiece shift apparatus as claimed in claim 13, wherein a second bar is formed on the middle plate parallel to the second direction, a second sliding block is slidably attached on the second bar, the third horizontal piston cylinder is installed on the second sliding block, and a pair of second guiding blocks is secured on the middle plate on opposite sides of the second bar to thereby guide movement of the second sliding block.

* * * * *